(12) United States Patent
Tai et al.

(10) Patent No.: US 7,712,941 B2
(45) Date of Patent: May 11, 2010

(54) CONNECTOR ASSEMBLY

(75) Inventors: Yu-Yuan Tai, Taoyuan Hsien (TW); Chen-Jung Chen, Taoyuan Hsien (TW); Jian-Ping Cao, Taoyuan Hsien (TW); Zhong-Ming Zhang, Taoyuan Hsien (TW); Bo Bai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 63 days.

(21) Appl. No.: 12/199,280

(22) Filed: Aug. 27, 2008

(65) Prior Publication Data
US 2009/0129113 A1 May 21, 2009

(30) Foreign Application Priority Data
Nov. 16, 2007  (TW) .............................. 96143392 A

(51) Int. Cl.
*F21V 33/00* (2006.01)
(52) U.S. Cl. ................... 362/581; 439/490; 439/620.13

(58) Field of Classification Search ................. 362/561, 362/581; 439/676, 488, 490, 607.01, 607.23, 439/620.13
See application file for complete search history.

(56) References Cited

U.S. PATENT DOCUMENTS

| 5,876,239 A      | * | 3/1999 | Morin et al. ................. 439/490 |
| 2001/0000767 A1  | * | 5/2001 | Ezawa et al. ................ 439/490 |
| 2007/0155223 A1  | * | 7/2007 | Huang et al. ................ 439/490 |

* cited by examiner

*Primary Examiner*—Laura Tso
(74) *Attorney, Agent, or Firm*—Muncy, Geissler, Olds & Lowe, PLLC

(57) ABSTRACT

A connector assembly is provided. The connector assembly includes a housing having at least a socket, an electronic device disposed in the housing, a protection member disposed on a side of the housing, a light emitting element disposed on the protection member, a light pipe disposed on the housing for guiding light from the light emitting element, a shield surrounding the protection member and the light emitting element, and a cover encompassing the light pipe, the shield, and the light emitting element.

22 Claims, 7 Drawing Sheets

US 7,712,941 B2

CONNECTOR ASSEMBLY

CROSS REFERENCE TO RELATED APPLICATIONS

This Non-provisional application claims priority under 35 U.S.C. §119(a) on Patent Application No(s). 096143392 filed in Taiwan, Republic of China on Nov. 16, 2007, the entire contents of which are hereby incorporated by reference.

BACKGROUND OF THE INVENTION

1. Field of the Invention

The invention relates to a connector assembly and in particular to a connector assembly having light emitting elements and light pipes.

2. Description of the Related Art

The conventional connector usually includes several interior components such as chokes, filters, resisters, capacitors, transformers, and light-emitting diodes (LEDs) for providing specific functions. The interior components are assembled and arranged according to electronic specifications and functional requirements, wherein at least one printed circuit board (PCB) can be provided for electrical connection between the interior components. However, the PCB not only occupy considerable space, but also generate electromagnetic interference (EMI), which interferes with signal transmission.

The conventional connectors may use LEDs as light emitting elements showing operation states thereof. As shown in FIG. 1, an LED 11 is positioned in a rear part of a connector 1. Since the LED 11 is disposed inside the connector 1, EMI and noise may occur between the LED 11 and other interior components, such as choices or transformers, adversely affecting reliability and efficiency thereof. As operational speed of the connectors increase, for example, from 10 Mbps to as fast as 1 Gbps, EMI issues also increase and can become a very serious problem.

BRIEF SUMMARY OF INVENTION

To eliminate the disadvantages of the conventional connectors, the present invention provides a connector assembly including light emitting elements and light pipes. A shield having barrel-like shaped structures prevents light scattering and EMI from the light emitting elements so that the reliability of the connector assembly is improved.

An embodiment of the present invention provides a connector assembly including a housing having at least a socket, an electronic device disposed in the housing, a protection member disposed on a side of the housing, a light emitting element disposed on the protection member, a light pipe disposed on the housing for guiding light from the light emitting element, a shield surrounding the protection member and the light emitting element, and a cover encompassing the light pipe, the shield, and the light emitting element.

In one embodiment of the present invention, the housing includes a first casing and a second casing connected to each other by engaging, adhering or fastening. The electronic device includes a circuit board horizontally disposed between the first and second casings. However, the housing can also be integrally formed as a monolithic piece by injection molding.

In one embodiment of the present invention, the housing has a channel on a top inner surface thereof, and the light pipe has an extended portion inserted through the channel and exposed to a lateral surface of the housing. The light emitting element can be an LED.

In one embodiment of the present invention, the cover comprises a front member and a rear member connected to each other, wherein the front member has a plurality of legs connected to ground. The front and rear members are connected to each other by engaging, adhering or fastening. The shield contacts the rear member.

In one embodiment of the present invention, the cover includes metal and is integrally formed as a monolithic piece by stamping. The housing includes a plurality of recesses, and the electronic device comprises a plurality of pins received in the recesses and electrically connected to an external plug. The electronic device may include a transformer, a capacitor, or other electronic components.

In one embodiment of the present invention, the housing includes a hole, and the light pipe has at least a hook engaged with in the hole for positioning of the light pipe. The light pipe may include plastic, glass or acrylics.

In one embodiment of the present invention, the protection member includes a first engaging member, and the shield includes a second engaging member engaged with the first engaging member. The protection member may include plastic or electrical insulating material, and the shield may include metal. Specifically, the shield includes at least a partition for dividing the shield into a plurality of cavities for allowing the light emitting element to be inserted therein. The partition is barrel-like shaped by cutting the shield and then bending inwardly.

In one embodiment of the present invention, the connector assembly, such as an RJ-45 connector, further includes a main circuit board disposed at the bottom of the housing, and the light emitting element comprises a plurality of terminals electrically connected to the main circuit board.

The present invention further provides a connector assembly including a housing having a plurality of sockets, an electronic device disposed in the housing, a protection member disposed on a side of the housing, a plurality of light emitting elements disposed on the protection member, a plurality of light pipes disposed on the housing for guiding light from the light emitting element, a shield surrounding the protection member and the light emitting element, and a cover encompassing the light pipes, the shield, and the light emitting elements, wherein the sockets are arranged in two rows aligned with each other.

BRIEF DESCRIPTION OF DRAWINGS

The present invention will become more filly understood from the detailed description given herein below and the accompanying drawings which are given by way of illustration only, and thus are not limitative of the present invention, and wherein.

DETAILED DESCRIPTION OF INVENTION

Figure 1:
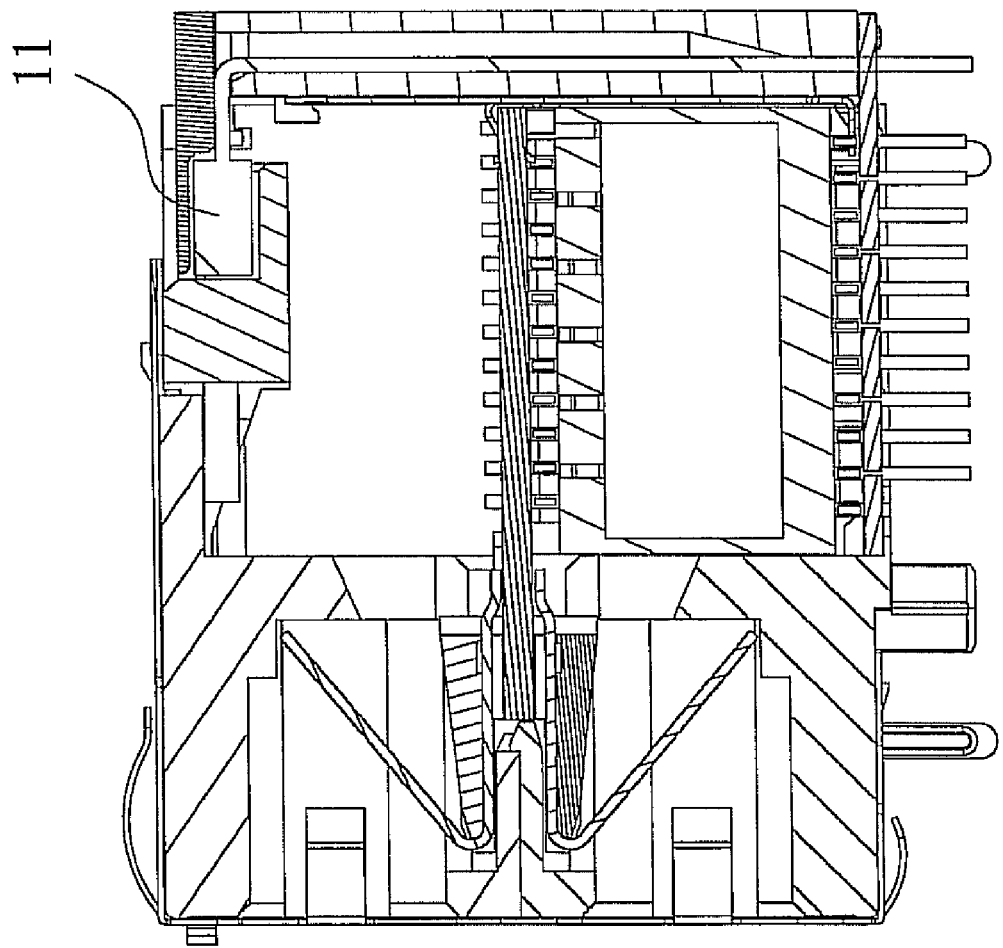
FIG. 1 is a cross-sectional view of a conventional connector.
Figure 2A:
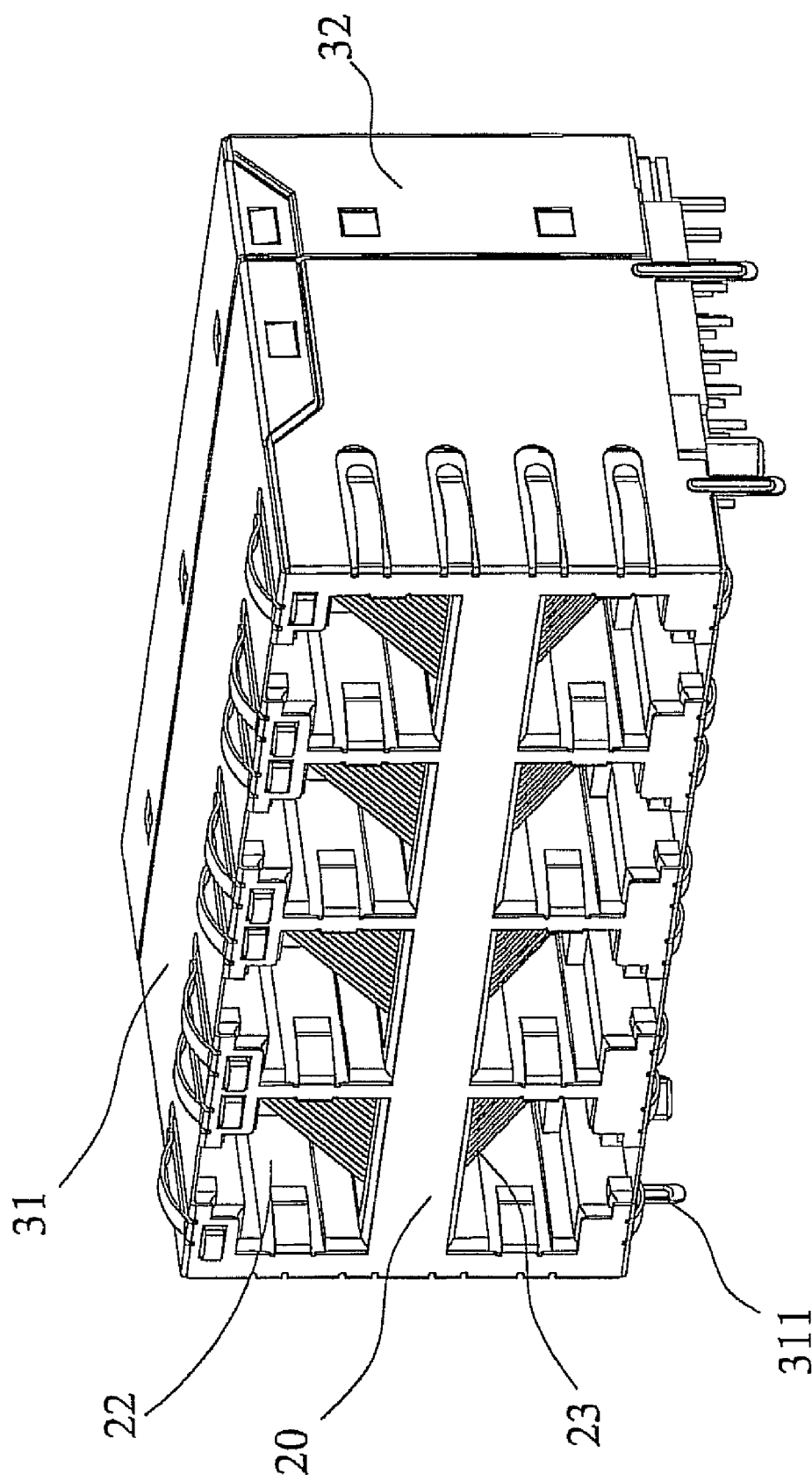
FIG. 2A is a perspective diagram of an embodiment of a connector assembly according to the present invention.
Figure 2B:
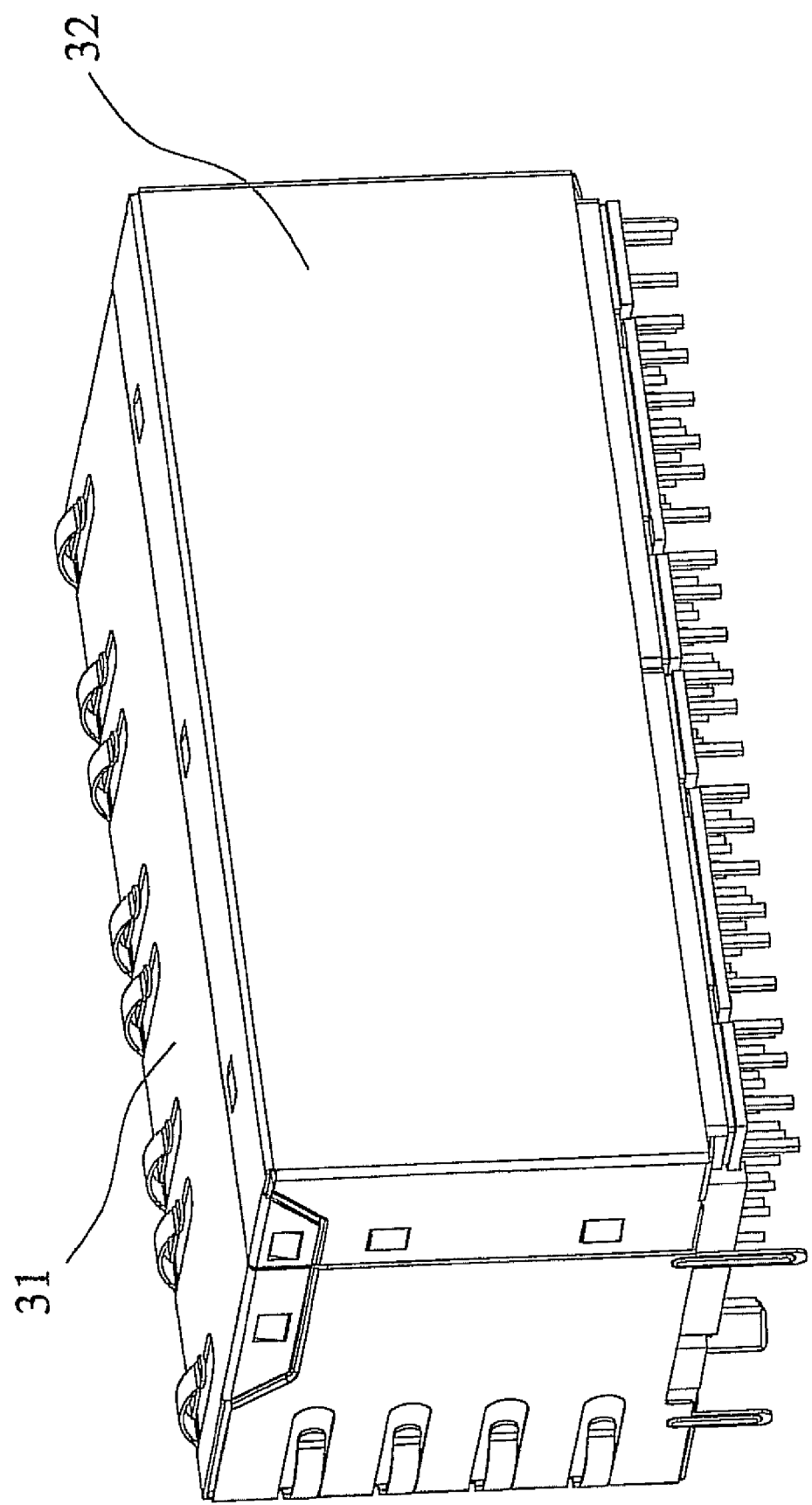
FIG. 2B is another perspective diagram of the connector assembly shown in FIG. 2A.
Figure 2C:
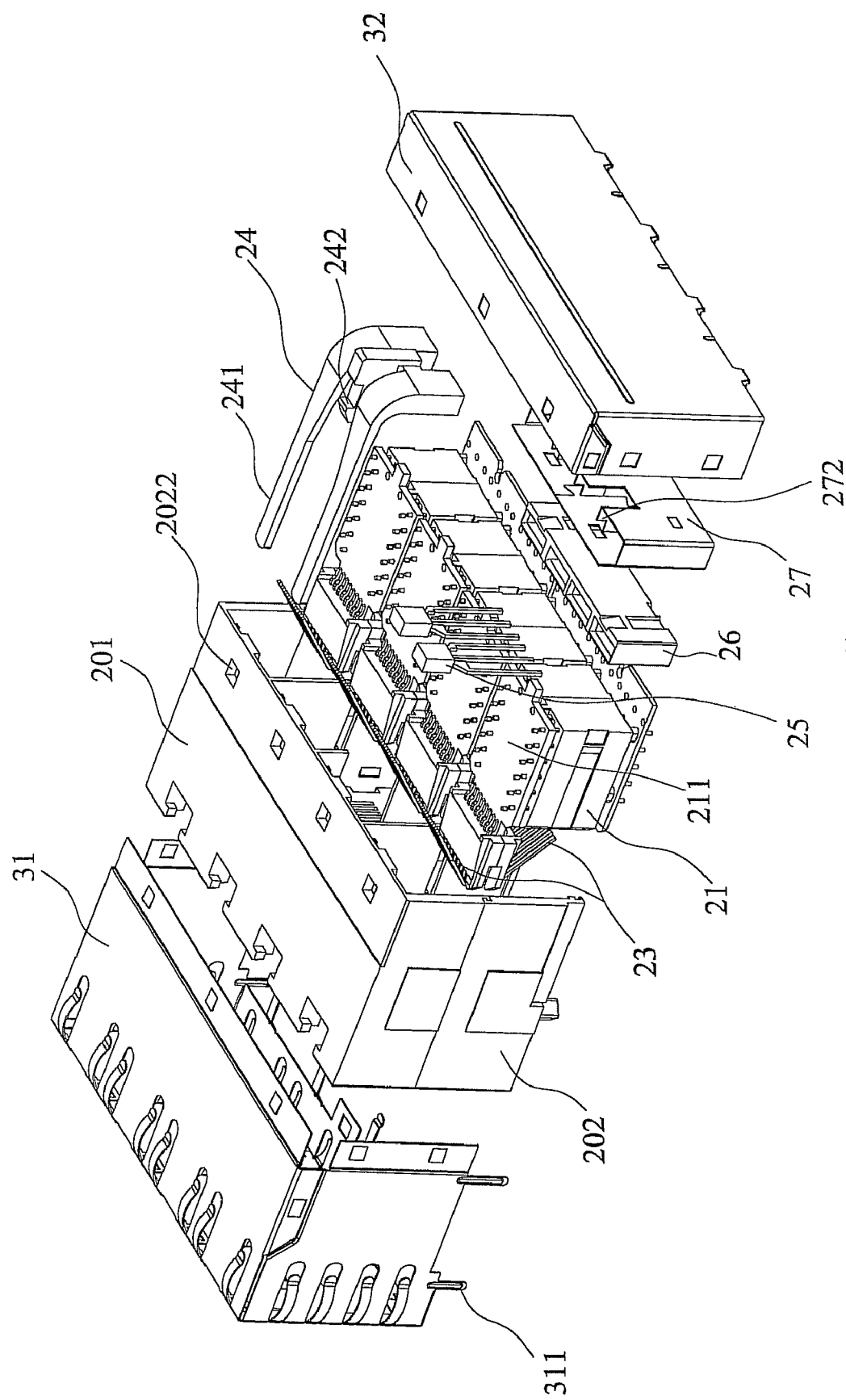
FIG. 2C is an exploded diagram of the connector assembly shown in FIG. 2A.

Referring to FIGS. 2A-2D, an embodiment of a connector assembly 2 according to the present invention, such as an RJ-45 connector, includes a housing 20, an electronic device 21, and a cover. As shown in FIG. 2C, the housing 20 includes a first casing 201 and a second casing 202. The first and second casings 201, 202 can be connected to each other by engaging, adhering or fastening. Furthermore, the first and second casings 201, 202 can be integrally formed as a monolithic piece by injection molding. As shown in FIG. 2A, the housing 20 forms two rows of sockets 22 aligned with each other.

The electronic device 21 is disposed in the housing 20 and includes a plurality of pins 23 received in a plurality of recesses of the housing 20, correspondingly. When inserting an external plug into the sockets 22, the external plug electrically connects to the pins 23.

The electronic device 21 further includes a plurality of circuit boards 211 horizontally disposed between the first and second casings 201, 202. The housing 20 is encompassed by the cover, which includes a front member 31 and a rear member 32, wherein the front and rear members 31, 32 can be connected to each other by engaging, adhering or fastening. The front member 31 has a plurality of legs 311 connected to ground. In this embodiment, the front and rear members 31, 32 can be metal and integrally formed as a monolithic piece by stamping. The electronic device 21 may include a transformer, a capacitor, or other electronic components.

Figure 2D:
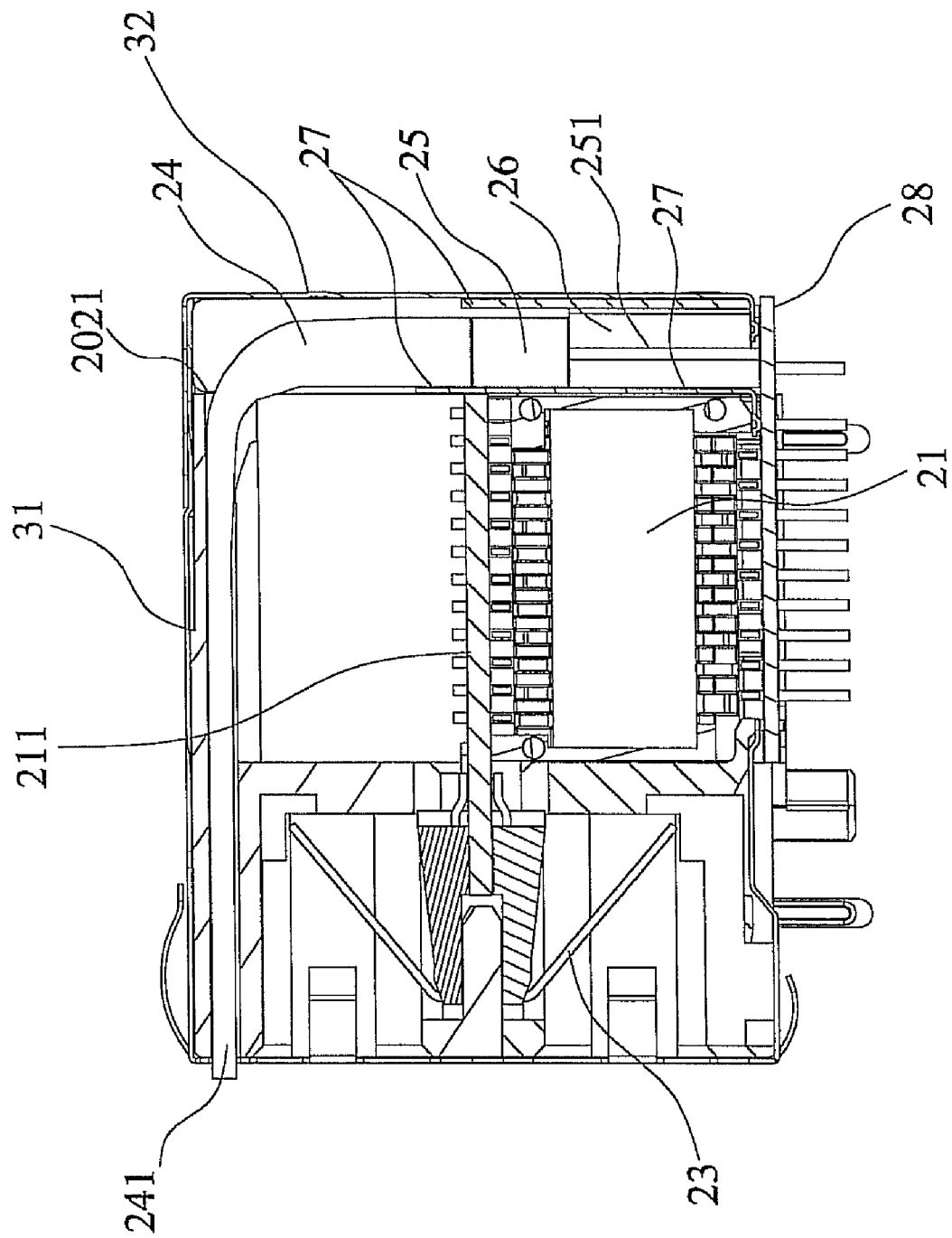
FIG. 2D is a cross-sectional view of the connector assembly shown in FIG. 2A.

Referring to FIGS. 2C and 2D, the connector assembly 2 further includes at least a light pipe 24 and a light emitting element 25, and the housing 20 includes a plurality of channels 2021. Two parallel extended portions 241 of the light pipe 24 are inserted through the channels 2021 and exposed to the front side of the housing 20. As shown in FIG. 2D, the bottom of the light pipe 24 abuts the light emitting element 25 so that light from the light emitting element 25 is guided to a front side of the housing 20 for showing the operational state of the connector assembly 2. As shown in FIG. 2C, at least a hook 242 is formed between the two adjacent extended portions 241 and engaged with the corresponding hole 2022 of the housing 20 so that the light pipes 24 can be fixed to the housing 20. The light emitting element 25 can be an LED, and the light pipe 24 can be plastic, glass or acrylics. In some embodiments, the light pipe 24 can be dovetail shaped.

Figure 3:
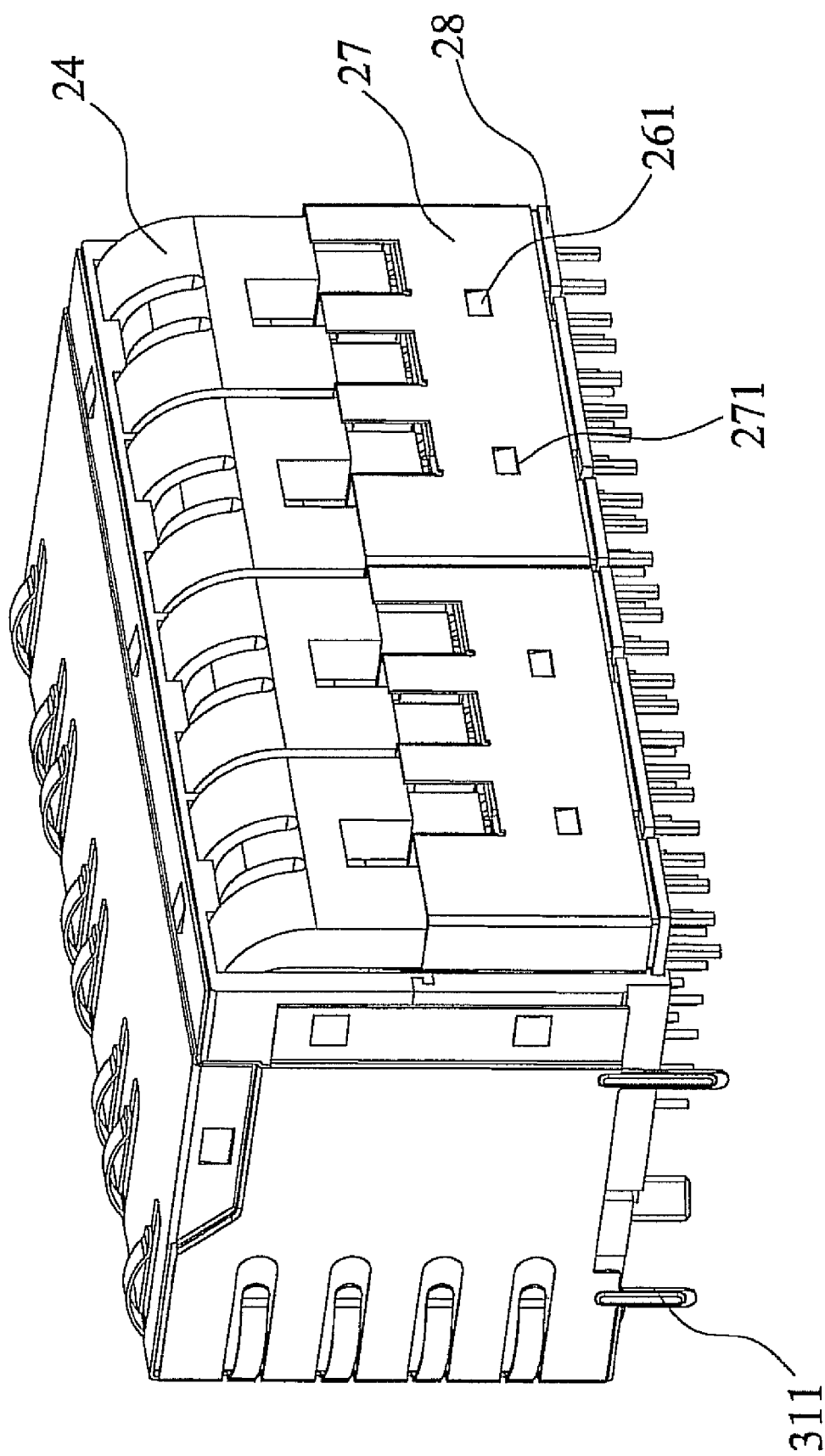
FIG. 3 is a perspective diagram of the connector assembly shown in FIG. 2A without the rear member.
Figure 4:
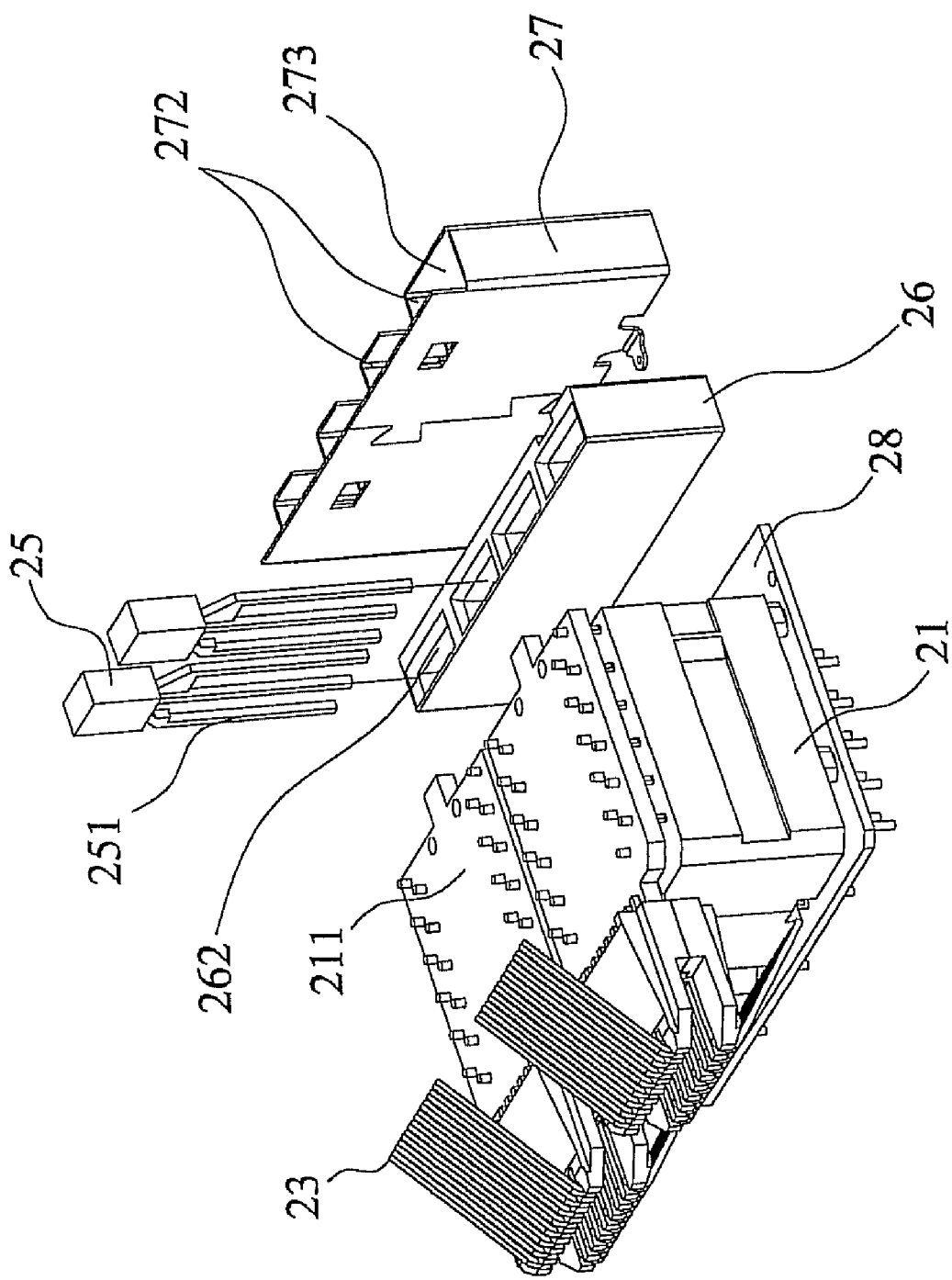
FIG. 4 is an exploded diagram of parts of the connector assembly shown in FIG. 2A.

Referring to FIGS. 3 and 4, the light emitting element 25 is received in a slot 262 of a protection member 26, wherein the light emitting element 25 and the protection member 26 are encompassed by a shield 27. As shown in FIG. 3, the protection member 26 has a first engaging member 261, and correspondingly, the shield 27 has a second engaging member 271 engaged with the first engaging member 261. The protection member 26 can be plastic or electrical insulating material, and the shield 27 can be metal. In FIG. 4, the shield 27 includes a plurality of partitions 272 for dividing the shield 27 into several cavities 273 for allowing the light emitting elements 25 to be inserted therethrough, respectively. Here, the partitions 272 are barrel-like shaped by cutting the shield 27 and then bending the shield 27 inwardly.

During assembling, the protection member 26 is connected to the shield 27 from the bottom thereof, wherein the first and second engaging members 261, 271 are engaged with each other. Subsequently, the light emitting elements 25 are inserted into the slots 262 of the protection member 26 through the cavities 273 so that terminals 251 of the light emitting elements 25 project downward and connect to a circuit board 28 below the connector assembly 2, as shown in FIG. 2D. With the light emitting elements 25 and the protection member 26 encompassed by the shield 27, light scattering from the light emitting elements 25 is prevented. Lastly, the rear member 32 is joined with the front member 31 to conceal the light pipe 24, wherein the shield 27 contacts the rear member 32.

This invention provides a connector assembly comprising a rear member 32 for insulating noise. The rear member 32 not only conceals the light pipe 24, but also connects to the shield 27 and the front member 31, wherein disorder signals can be efficiently eliminated by grounding via the ground legs 311 of the front member 31, thus preventing EMI and improving reliability of signal transmissions.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A connector assembly comprising:
    a housing;
    an electronic device disposed in the housing;
    a protection member disposed on a side of the housing;
    a light emitting element disposed on the protection member;
    a light pipe coupled to the housing for guiding light from the light emitting element;
    a shield surrounding the protection member and the light emitting element; and
    a cover encompassing the light pipe, the shield, and the light emitting element.

2. The connector assembly as claimed in claim 1, wherein the housing comprises a first casing and a second casing, both of which are connected to each other by engaging, adhering or fastening.

3. The connector assembly as claimed in claim 2, wherein the electronic device comprises a circuit board horizontally disposed between the first and second casings.

4. The connector assembly as claimed in claim 1, wherein the housing is integrally formed as a monolithic piece by injection molding.

5. The connector assembly as claimed in claim 1, wherein the housing has a channel on a top inner surface thereof, and the light pipe has an extended portion inserted through the channel and exposed to a lateral surface of the housing.

6. The connector assembly as claimed in claim 1, wherein the light emitting element is an LED.

7. The connector assembly as claimed in claim 1, wherein the cover comprises a front member and a rear member, wherein the front member has a plurality of legs connected to ground, and the front and rear members are connected to each other by engaging, adhering or fastening.

8. The connector assembly as claimed in claim 7, wherein the shield contacts the rear member.

9. The connector assembly as claimed in claim 1, wherein the cover comprises metal and is integrally formed as a monolithic piece by stamping.

10. The connector assembly as claimed in claim 1, wherein the housing comprises a plurality of recesses, and the electronic device comprises a plurality of pins received in the recesses so that an external plug can be electrically connected to the pins.

11. The connector assembly as claimed in claim 1, wherein the housing comprises a hole, and the light pipe has at least a hook engaged with the hole for positioning of the light pipe.

12. The connector assembly as claimed in claim 1, wherein the protection member comprises a first engaging member, and the shield comprises a second engaging member engaged with the first engaging member.

13. The connector assembly as claimed in claim 1, wherein the shield comprises at least a partition for dividing the shield into a plurality of cavities with the light emitting element to be inserted therein.

14. The connector assembly as claimed in claim 13, wherein the partition is barrel-like shaped by cutting the shield and bending inwardly.

15. The connector assembly as claimed in claim 1, further comprising a main circuit board disposed at the bottom of the housing, and the light emitting element comprises a plurality of terminals electrically connected to the main circuit board.

16. The connector assembly as claimed in claim 1, wherein the light pipe comprises plastic, glass or acrylics.

17. The connector assembly as claimed in claim 1, wherein the protection member comprises plastic or electrical insulating material.

18. The connector assembly as claimed in claim 1, wherein the shield comprises metal.

19. The connector assembly as claimed in claim 1, wherein the connector assembly is an RJ-45 connector.

20. A connector assembly comprising:
a housing having a plurality of sockets;
an electronic device disposed in the housing;
a protection member disposed on a side of the housing;
a plurality of light emitting elements disposed on the protection member;
a plurality of light pipes disposed on the housing for guiding light from the light emitting elements; and
a shield, surrounding the protection member and the light emitting elements; and
a cover encompassing the light pipes, the shield, and the light emitting elements.

21. The connector assembly as claimed in claim 20, wherein the sockets are arranged in two rows aligned with each other.

22. The connector assembly as claimed in claim 20, wherein the electronic device comprises a transformer or a capacitor.

* * * * *